United States Patent
Huang et al.

(10) Patent No.: US 9,829,727 B2
(45) Date of Patent: Nov. 28, 2017

(54) POLYMER-CLAD OPTICAL MODULATORS

(71) Applicant: HEWLETT PACKARD ENTERPRISE DEVELOPMENT LP, Houston, TX (US)

(72) Inventors: Zhihong Huang, Palo Alto, CA (US); Di Liang, Santa Barbara, CA (US); Zhen Peng, Foster City, CA (US); Raymond G Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/305,930

(22) PCT Filed: May 7, 2014

(86) PCT No.: PCT/US2014/037063
§ 371 (c)(1),
(2) Date: Oct. 21, 2016

(87) PCT Pub. No.: WO2015/171125
PCT Pub. Date: Nov. 12, 2015

(65) Prior Publication Data
US 2017/0045762 A1    Feb. 16, 2017

(51) Int. Cl.
*G02F 1/035* (2006.01)
*G02F 1/065* (2006.01)
(Continued)

(52) U.S. Cl.
CPC ............ *G02F 1/065* (2013.01); *G02B 6/122* (2013.01); *G02B 6/29341* (2013.01);
(Continued)

(58) Field of Classification Search
CPC .................. G02B 6/29341; G02B 6/29343
See application file for complete search history.

(56) References Cited

U.S. PATENT DOCUMENTS 6,091,463 A    7/2000  Robinson et al.
7,616,850 B1 *  11/2009  Watts ................ G02B 6/29335
                                                        385/2
(Continued)

FOREIGN PATENT DOCUMENTS

WO    WO-2012173620 A1    12/2012

OTHER PUBLICATIONS

PCT/ISA/KR, International Search Report, PCT/US2014/037063, dated Feb. 10, 2015.
(Continued)

*Primary Examiner* — Rhonda Peace
(74) *Attorney, Agent, or Firm* — Hewlett Packard Enterprise Development Patent Department (57) ABSTRACT

A polymer-clad optical modulator includes a substrate comprising an insulating material; a silicon microring on the substrate; silicon waveguides on the substrate adjacent the silicon microring; an electro-optic polymer covering the silicon microring and the silicon waveguide; and an electrical contact on top of the electro-optic polymer. The silicon microring or a portion of an adjacent silicon layer is lightly doped. A polymer-clad depletion type optical modulator and a polymer-clad carrier injection type optical modulator, each employing the lightly doped silicon microring or an adjacent lightly doped silicon layer, are also described.

18 Claims, 5 Drawing Sheets

(51) Int. Cl.
  *G02B 6/122* (2006.01)
  *G02B 6/293* (2006.01)
  *G02F 1/00* (2006.01)
  *G02F 1/025* (2006.01)
  *G02B 6/12* (2006.01)

(52) U.S. Cl.
  CPC ............ *G02F 1/0018* (2013.01); *G02F 1/025* (2013.01); *G02B 2006/12061* (2013.01); *G02B 2006/12085* (2013.01); *G02B 2006/12142* (2013.01); *G02F 2201/12* (2013.01); *G02F 2202/022* (2013.01); *G02F 2202/103* (2013.01); *G02F 2202/105* (2013.01); *G02F 2203/055* (2013.01); *G02F 2203/15* (2013.01)

(56) References Cited

U.S. PATENT DOCUMENTS

| | | | |
|---|---|---|---|
| 7,894,696 B2 | 2/2011 | Baehr-Jones et al. | |
| 8,081,851 B2* | 12/2011 | Koos | G02F 1/011 385/1 |
| 8,295,655 B2* | 10/2012 | Manipatruni | G02B 6/12007 385/2 |
| 8,380,016 B1 | 2/2013 | Hochberg et al. | |
| 8,538,206 B1 | 9/2013 | Fish et al. | |
| 9,134,169 B2* | 9/2015 | Li | G01J 1/0209 |
| 2006/0215949 A1* | 9/2006 | Lipson | G02F 1/025 385/2 |
| 2008/0193133 A1* | 8/2008 | Krug | G02B 6/12007 398/83 |
| 2009/0297094 A1 | 12/2009 | Hochberg et al. | |
| 2010/0015741 A1* | 1/2010 | Krug | G02B 6/12007 438/31 |
| 2010/0021124 A1* | 1/2010 | Koos | G02F 1/011 385/141 |
| 2010/0098372 A1 | 4/2010 | Manipatruni et al. | |
| 2013/0004137 A1 | 1/2013 | Jin et al. | |
| 2013/0279845 A1 | 10/2013 | Kobrinsky et al. | |
| 2016/0327818 A1* | 11/2016 | Vo | G02F 1/025 |
| 2017/0045762 A1* | 2/2017 | Huang | G02B 6/122 |

OTHER PUBLICATIONS

Xu, M., et al, Design of a Silicon-Plasmonic Hybrid Electro-Optic Modulator, Photonics Global Conference (PGC), IEEE, 2012, 3 pages.

* cited by examiner

POLYMER-CLAD OPTICAL MODULATORS

BACKGROUND

Silicon photonic devices can be made using existing semiconductor fabrication techniques, and because silicon is already used as the substrate for most integrated circuits, it is possible to create hybrid devices in which the optical and electronic components are integrated onto a single microchip. Consequently, silicon photonics is being actively researched by many electronics manufacturers, as well as by academic research groups, who see it is a means for keeping on track with Moore's Law, by using optical interconnects to provide faster data transfer both between and within microchips.

An optical ring resonator is a set of waveguides in which at least one is a closed loop (e.g., the ring) coupled with some sort of light input and output. (These can be, but are not limited to, waveguides.) When light of the resonant wavelength is passed through the loop from input waveguide, it builds up in intensity over multiple round-trips due to constructive interference and is output to the output bus waveguide which serves as a detector waveguide. Because only a select few wavelengths will be at resonance within the loop, the optical ring resonator may function as a filter. A silicon ring resonator is an optical ring resonator using silicon as both the ring and the waveguide(s).

DETAILED DESCRIPTION

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint, such as due to manufacturing variabilities. The degree of flexibility of this term can be dictated by the particular variable and would be within the knowledge of those skilled in the art to determine based on experience and the associated description herein. In some examples, "about" may refer to a difference of ±10%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Silicon ring modulators are promising in ultralow power on-chip dense wavelength division multiplexing (DWDM) silicon (Si) photonic networks, but the heater in these devices, serving for wavelength tuning, consumes substantial energy, and fundamental semiconductor physics limits the speed. Electrooptic (EO) polymers cladding the modulator may be advantageous due to the potential of the polymer to further reduce power consumption and increase modulation speed. The refractive index of an EO polymer changes rapidly with electric field: 100 GHz tuning speed has been demonstrated. The insulating nature of the polymer can form a capacitive device, thereby eliminating current flow and providing energy savings. However, the existing polymer cladding modulators need a high bias voltage due to stringent structure and process requirements.

Many research groups have studied polymer-clad optical modulators and most have used two contacts adjacent the Si microrings for lateral poling of the electro-optic polymer and to apply an electric field. Silicon nitride ($Si_3N_4$) waveguide and polymer claddings have also been investigated. Slot waveguide silicon rings have been proposed for better coupling to the Si microring. However, all such approaches may require that the two contacts be placed close to the microring to reduce the driving voltages. Electrical static charge to vertically poll the polymer has also been investigated, but it requires a deposition of a new layer of the electro-static material.

Existing polymer modulator designs (already implemented by many research groups) may use a lateral biasing scheme to add the electric field laterally to the polymer. Due to process limitations, however, this method cannot place two electrodes close to each other (due to the Si waveguide spacing) and most of the electric field is thus added to the Si instead of to the polymer. As a consequence, the tuning efficiency may be low.

Previous work has used existing Si ring resonators to evaluate polymer modulator designs. By adding a layer of an electro-optic (EO) polymer, a slight tuning of resonant wavelengths has been observed by applying biases on the polymer. However, while the EO polymer has a tuning efficiency of greater than 60 pm/V, based on its EO coefficient $r_{33}$, the actual tuning efficiency in a Si ring resonator is considerably less. One important metric of an EO material is the EO activity, or coefficient, commonly measured as $r_{33}$, which governs the strength of the electrical field required to change the refractive index. When the EO activity of a material is high, less electric field strength is required to change the refractive index. One possible reason for the low tuning efficiency may be a non-optimized Si microring design for the polymer cladding.

In accordance with the teachings herein, in some examples, the Si microring may be lightly doped and used as one electrode for vertical polling of the electro-optic polymer. In some other examples, a silicon layer adjacent the Si microring may be lightly doped and used as one electrode for vertical polling. In either case, the structure may bring process simplicity and reduce the operation power for the low power optical network.

As mentioned above, one reason for the low tuning efficiency may be the non-optimized optical confinement in polymer. Simulations in FIGS. 1A-1C and 2A-2C show that by using slot waveguides and narrower waveguides (200 nm-wide), the mode fill factor in polymer increases dramatically, compared with using the current 450 nm waveguide design.

Figure 1A:
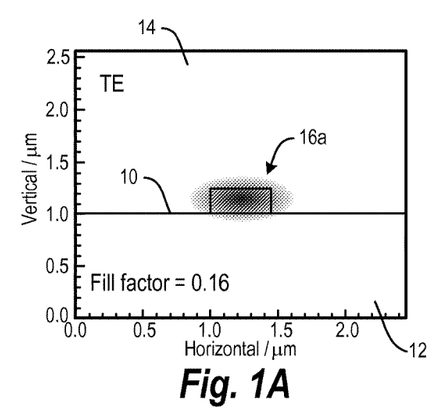
FIGS. 1A-1C, on coordinates of vertical distance and horizontal distance, are each a simulation of the transverse-electric (TE) optical mode coupled to a waveguide for different widths and configurations of the waveguide, according to an example.
Figure 1B:
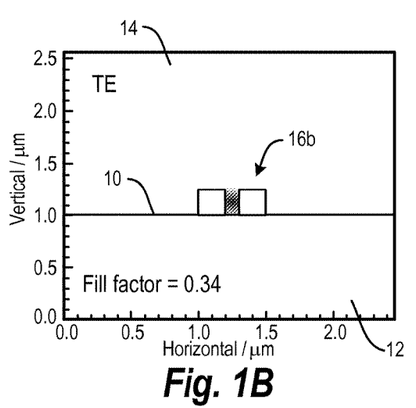
Figure 1C:
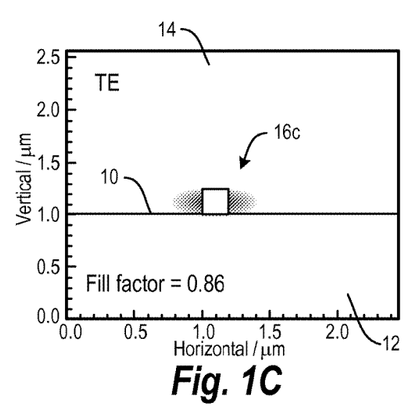
Figure 2A:
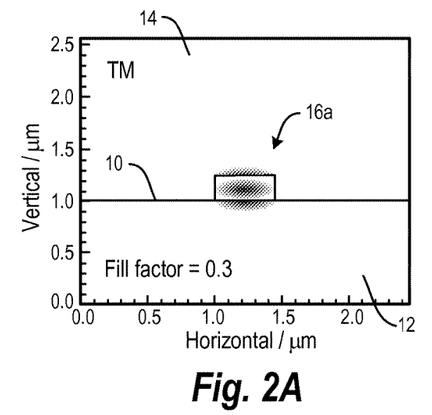
FIGS. 2A-2C, on coordinates of vertical distance and horizontal distance, are each a simulation of the transverse-magnetic (TM) optical mode coupled to a waveguide for different widths and configurations of the waveguide, according to an example.
Figure 2B:
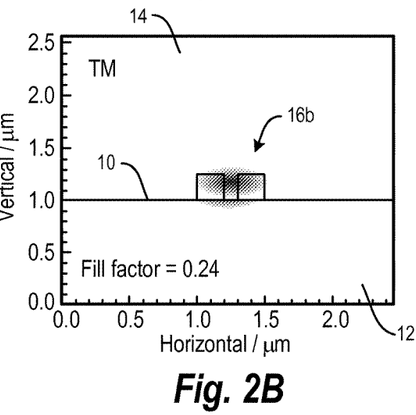
Figure 2C:
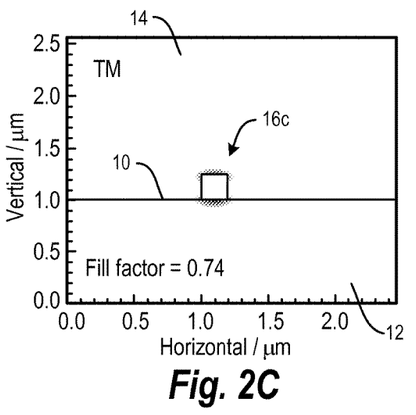

FIGS. 1A-1C and 2A-2C show the simulation of the optical modes (TE and TM) coupled to the waveguide, where the simulation of the optical mode TE (transverse-electrical) is depicted in FIGS. 1A-1C and the simulation of the optical mode TM (transverse-magnetic) is depicted in FIGS. 2A-2C. An interface 10 is shown between an insulating substrate 12 and an electro-optic polymer 14 that encapsulates the silicon waveguides 16. Silicon waveguide 16a is shown in FIGS. 1A and 2A and has a width of 0.45 µm (450 nm), a dimension that may be presently used in some devices. Silicon waveguide 16b is shown in FIGS. 1B and 2B and is a slot waveguide, where each waveguide has a width of 0.2 µm (200 nm), and the slot width is 0.1 µm (100 nm). Silicon waveguide 16c is shown in FIGS. 1C and 2C and has a width of 0.2 µm.

The silicon waveguides 16a-16c have an index of refraction of about 3.5, while the electro-optic polymer has an index of refraction of about 1.55. For this type of device, the concern is how much electric field can be coupled to the polymer. Here, fill factor in each Figure is defined as how much of the mode energy is coupled outside of the Si waveguide 16; i.e. how much is coupled inside of the polymer 14. For FIGS. 1A and 2A, the fill factor is only 0.16 and 0.3 for TE and TM mode, respectively. FIGS. 1B and 2B and FIGS. 1C and 2C show the results for the Si waveguide in accordance with the teachings herein, which can increase the coupling factor a considerable amount, using the slot waveguide 16b (FIGS. 1B and 2B) and narrower Si waveguides 16c (FIGS. 1C and 2C).

It will be appreciated that the coupling efficiency in each mode may not necessarily be better than the original condition. FIGS. 1B and 2B are the TE and TM mode for the slot waveguide, respectively. The FIG. 1B TE mode coupling efficiency is two times better than the FIG. 1A TE mode coupling efficiency, so in the actual design, one can input TE mode light into the waveguide to improve the coupling efficiency at TE mode.

Also, the simulation only includes condition of the slot waveguide width and etching depth; other conditions may also change the coupling efficiency in the TM mode. The values here are for reference.

Figure 3A:
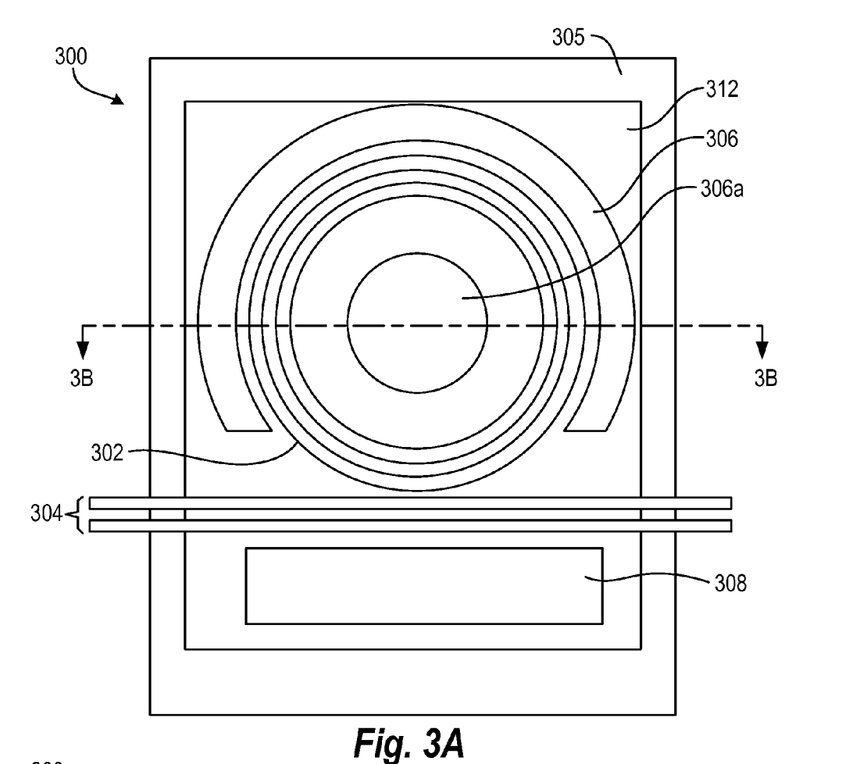
FIG. 3A is a top plan view of an optical modulator, depicting vertical biasing of an electro-optic (EO) polymer-clad optical modulator, according to an example.
Figure 3B:
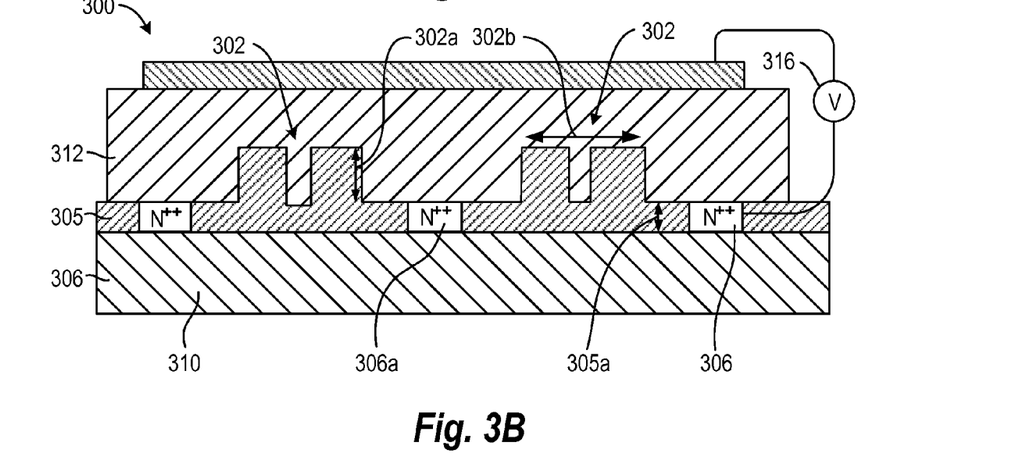
FIG. 3B is a cross-sectional view of FIG. 3A, taken along the line 3B-3B.
Figure 4A:
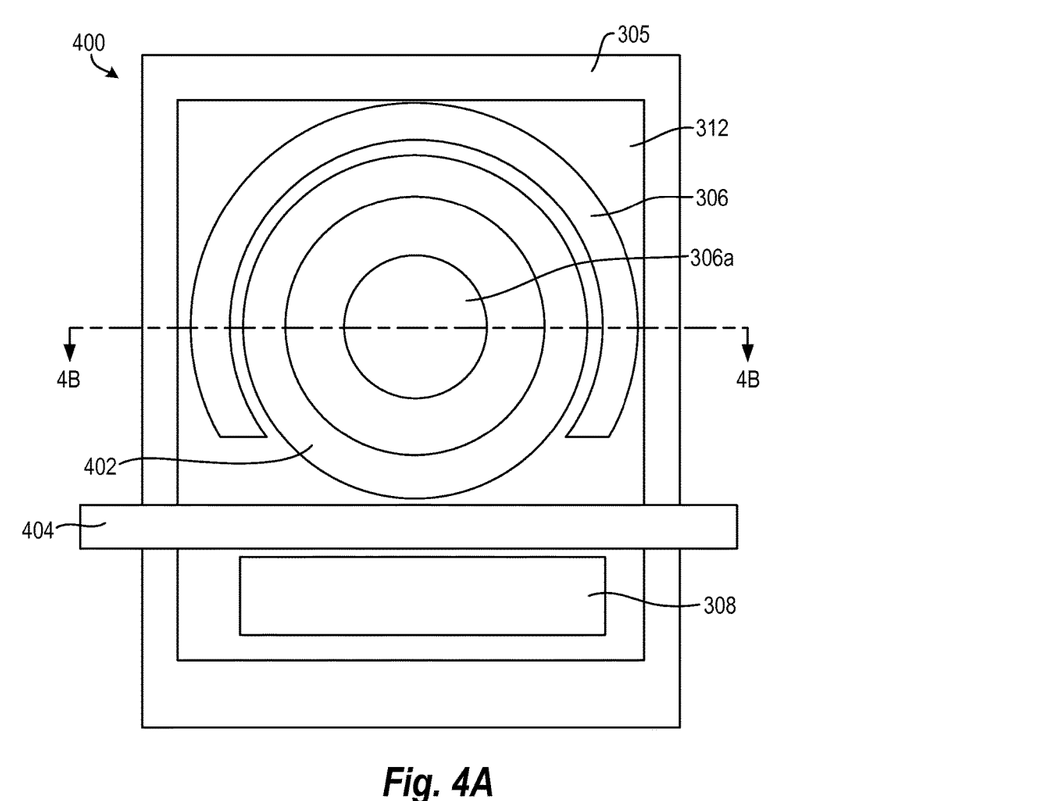
FIG. 4A is a top plan view of another optical modulator, depicting vertical biasing of an EO polymer-clad optical modulator, according to an example.
Figure 4B:
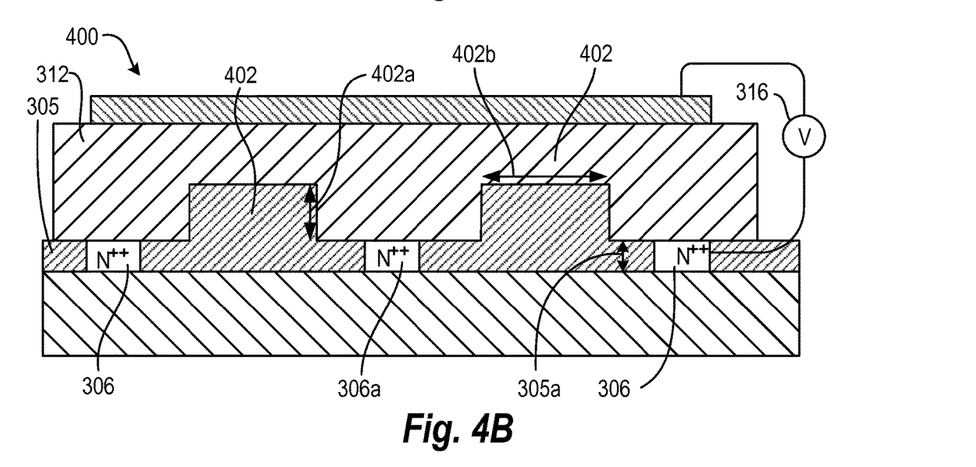
FIG. 4B is a cross-sectional view of FIG. 4A, taken along the line 4B-4B.
Figure 5A:
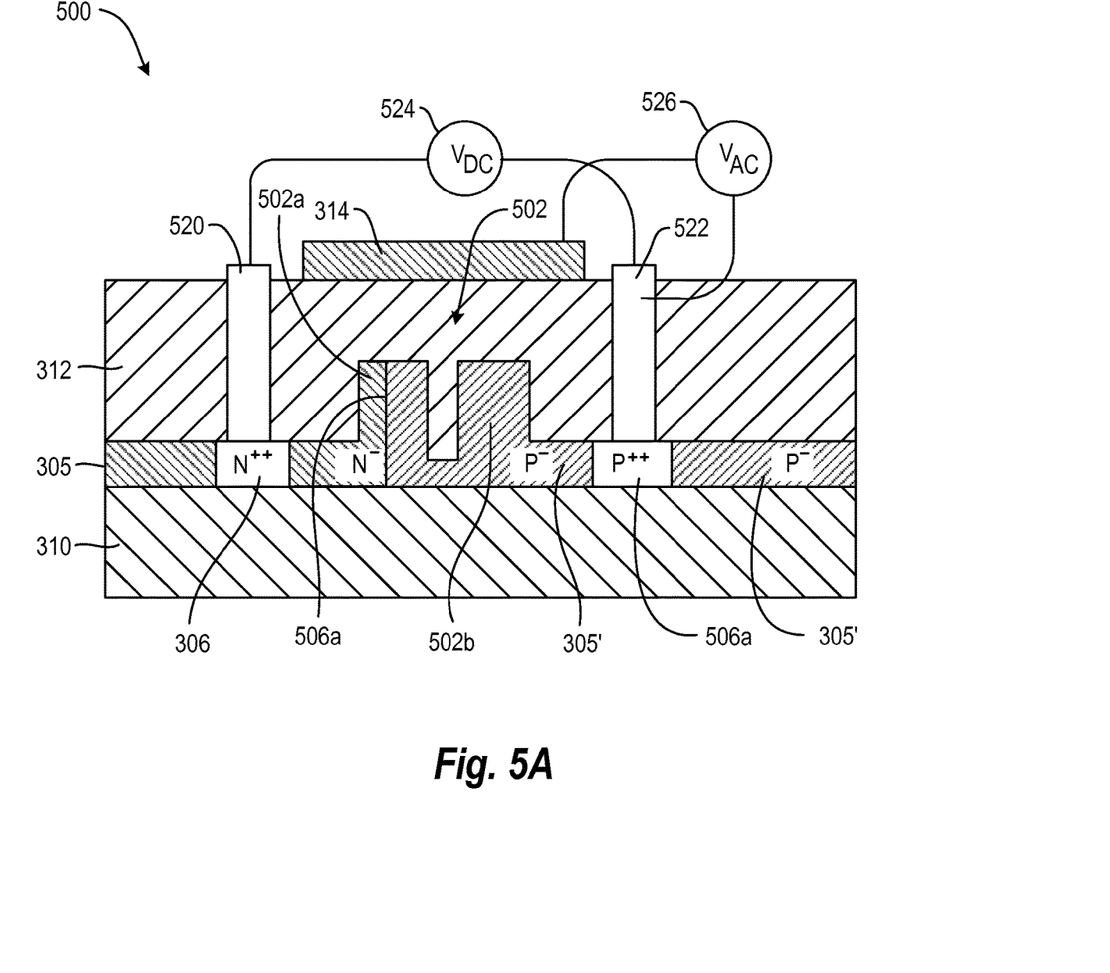
FIG. 5A is a cross-sectional view of a polymer-clad optical modulator, depicting a depletion type silicon modulator, according to an example.
Figure 5B:
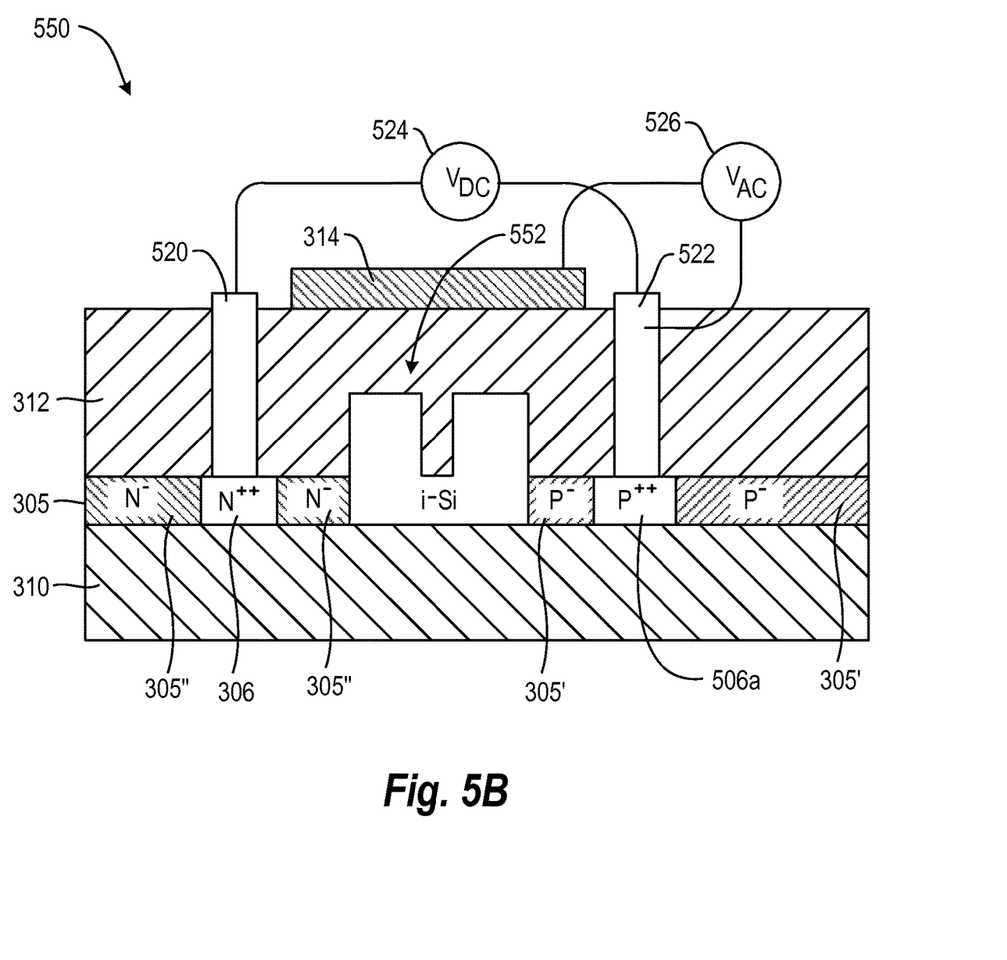
FIG. 5B is a cross-sectional view of a polymer-clad optical modulator, depicting a carrier injection type silicon modulator, according to an example.

In addition to the use of the slot waveguide and narrower waveguide, the Si microring may be lightly doped and used as one electrode for polymer vertical polling. In this case, a top electrode on the electro-optic polymer 10 can be ITO (indium tin oxide) or other electrically conducting material. Previous research in depletion mode ring modulators has shown that lightly doped Si can still have decent ring resonances and waveguide loss only increasing by 2 dB/cm by implanting Si at $5 \times 10^{15}$ to $5 \times 10^{17}$ $cm^3$. Dopants that are commonly used as n-type dopants in Si, such as phosphorus (P) or arsenic (As), may be used to achieve the light doping. Alternatively, p-type dopants, such as boron (B), may be used, in the same doping concentration range. In the electro-optic polymer structure, the Si ring as well as pedestals can be implanted at a similar dosage. The detailed device structures are shown in FIGS. 3-5. By using the Si ring as the bottom contact, this makes the device process much easier. These vertical structures facilitate improved fill factors and EO polymer poling.

FIGS. 3A-3B show one example of a polymer-clad optical modulator design in accordance with the teachings herein. It uses the vertical bias scheme discussed above. A feature of this structure is the light doping of the bulk Si on the SOI (silicon-on-insulator) substrate, then etch the Si waveguide, and finally highly dope the contact regions to form ohmic contacts. By using this method, the lightly-doped Si can be conductive and act as one electrode or contact layer. Since the EO polymer is an insulating material, then by adding another contact on top of the polymer, it can form a vertical capacitor on the modulator to form a vertical bias scheme.

After depositing the EO polymer and then the transparent ITO contacts, the device can be biased vertically and thereby form a vertical electrical field. By using slot waveguides (FIGS. 1B, 2B, 3A-3B) or narrower waveguides (FIGS. 1C, 2C, 4A-4B), higher tuning efficiency may be expected. Also in this structure, most of the electric field is applied on the EO-polymer, which in turn means that better tuning efficiency and lower operating voltage are expected for the same tuning range. Since the highly-doped $N^{++}$ region is only for ohmic contacts, they can be further away from the Si waveguide and relax the stringent alignment requirement required in the prior structures.

FIG. 3A depicts a top view of a microring modulator 300. The modulator 300 includes a microring 302, here shown as a slot microring, and a waveguide 304, here shown as a slot waveguide. The microring 302 and the waveguide 304 may each be of silicon, formed as part of a thick silicon layer (not shown) that is patterned and thinned to provide a thinned layer 305 and the structural features 302 and 304 shown in FIG. 3B.

In addition to the features that form the microring 302 and waveguide 304, heavily doped regions 306 are formed in the thinned silicon layer 305. The thinned silicon layer itself may be formed of undoped, or intrinsic, silicon. By "undoped silicon" is meant that the silicon is not intentionally doped, although it may contain incidental dopants.

The microring 302 (and the waveguide 304) may have a thickness 302a of about 200 nm, although this thickness may have a range of about 150 to 500 nm. The microring may have a width 302b of about 200 to 300 nm; this value is smaller than the more conventional width of 450 nm commonly used, and may have some mode coupling to the EO polymer 312. For the slot microring 302 (and the slot waveguide 304), the slot may have a width in the range of about 50 to 150 nm. The thinned silicon layer 305 has a thickness 305a of about 50 nm, although this thickness may be in a range of about 50 to 150 nm.

The microring 302 may be lightly doped, as described above. The N-type region 306 partially surrounds the microring 302. The N-type region may be highly doped (e.g., greater than $10^{19}$ cm$^{-3}$) and may serve as an electrode. Because of the high doping, it is denoted as N$^{++}$. A similar N$^{++}$ region 306a may be formed in the center of the microring 302. Another N$^{++}$ region 308 may be formed on the opposite side of the waveguide 304 and may also serve as an electrode. However, this N$^{++}$ electrode 308 may or may not be necessary, depending on the application. In processing, the doping of the microring 302 may be performed first, then the microring may be masked, and the doping of the N-type regions 306 and 308 may be performed subsequently.

The entire assembly may be formed on an insulating substrate 310 (SOI; silicon-on-insulating), such as SiO$_2$. An electro-optic polymer 312 may be formed over the assembly, including the microring 302, the waveguide 304, and the N$^{++}$ regions 306, 308.

The EO polymer 312 may have a refractive index that changes with the applied electric field and may be composed of any of the known electro-optic polymers, including, but not limited to a class of electro-optic polymers, referred to as AJSP-series, which are a recently developed series of materials and have been shown to exhibit high electro-optic activity $r_{33}$ values of 50 to 200 pm/V. Another example of EO polymers includes a guest-host polymer made by doping polymethylmethacrylate (PMMA) with AJLZ53 chromophore, designated AJLZ53/PMMA. Yet another example of EO polymers includes a guest-host polymer made by doping amorphous polycarbonate (APC) with AJTB141 chromophore. Since the actual tuning efficiency of the device may be lower than the $r_{33}$ value, then the higher the $r_{33}$ value, the better.

A top electrode 314 may be formed on the EO polymer 312, and may include indium tin oxide (ITO) or other electrically conducting material. The top electrode 314 may extend over at least the microring 302 and the waveguide 304.

In the structure depicted in FIGS. 3A-3B, n-doped regions may be replaced with p-doped regions, employing the same dopant concentration ranges as described above.

FIGS. 4A-4B depict another example of a polymer cladding optical modulator 400. FIGS. 4A-4A are quite similar to FIGS. 3A-3B, except that the slot microring 302 in FIGS. 3A-3B is a solid microring 402 in FIGS. 4A-4B and the slot waveguide 304 in FIGS. 3A-3B is a solid waveguide 404 in FIGS. 4A-4B. Again, as in FIGS. 3A-3B, The microring 402 (and the waveguide 404) may have a thickness 402a of about 200 nm, although this thickness may have a range of about 150 to 500 nm, and the thickness can be large for multimode rings. The microring may have a width 402b of about 200 to 300 nm; this value is smaller than the more conventional width of 450 nm commonly used, and may have some mode coupling to the EO polymer 312.

In the devices 300, 400 depicted in FIGS. 3A-3B and 4A-4B, poling of the EO polymer 312 is achieved by applying an electric field, provided by a voltage source 316, between 306 and top electrode 314. The applied electric field may range from about 100 to 150 V$_{DC}$/μm and the temperature of poling may range from about 100 to 150° C., as is known.

In the structure depicted in FIGS. 4A-4B, n-doped regions may be replaced with p-doped regions, employing the same dopant concentration ranges as described above.

FIGS. 5A-5B show examples of tuning schemes for EO polymer modulators used in a photonic network in accordance with the teachings herein. FIG. 5A depicts an example of a depletion type Si modulator 500, while FIG. 5B depicts an example of a carrier injection type Si modulator 550.

In a high speed WDM photonic network, the modulators are required to operate at tens of GHz at the specific optical wavelengths (such as 1.31 μm and 1.55 μm). Examples of high speed networks include networks operating at 10 Gb/s, 25 Gb/s, and 40 Gb/s. Conventionally, the depletion mode or carrier injection mode Si modulators have been used for high speed tuning and a thermal tuner has been used to tune the optical wavelength (due to the change in refractive index with heat). The thermal tuner is an area of implanted Si as a resistor to locally heat the Si waveguide 304, 404, so it could consume a lot of energy for the device.

In further accordance with the teachings herein, since the EO polymer 312 has been proven to be able to tune at up to 100 GHz, then the EO-polymer may be used for high speed RF signal modulation and the carrier depletion or injection may be used for wavelength tuning. Since the design of the EO polymer 312 is effectively only a capacitor, its energy consumption is negligible. Consequently, this type of device may be more energy efficient than the conventional Si modulators.

In FIG. 5A (depletion type Si modulator 500), one-half of microring 502 is shown. While a slot microring 502 is shown, like the slot microring 302 in FIG. 3B, a solid microring 400 such as shown in FIG. 4B may alternatively be used. A first metal electrode 520 contacts N$^{++}$ region 306, while a second metal electrode 522 contacts P$^{++}$ region 506a. Metals usually used in silicon devices may be employed; examples include aluminum (Al), copper (Cu), and tungsten (W). The metal electrodes 520, 522 may extend through the EO polymer 312 as plugs.

At least an outer portion 502a of the microring 502 may be lightly doped with an n-type dopant (N$^-$). The portion of Si layer 305 from the outer portion 502a to the N$^{++}$ region 306 may also be lightly doped N$^-$. As in FIG. 3, the N$^-$ region 502a is doped to a level of about $5 \times 10^{15}$ to $5 \times 10^{17}$ cm$^{-3}$. At least an inner portion 502b of the microring 502 may be lightly doped with a p-type dopant (P$^-$). The portion of Si layer 305' from the inner portion 502b to the P$^{++}$ region 506a, as well as the layer on the other side of P$^{++}$ region, may also be lightly doped P$^-$, both regions 502b, 305' also being doped to a level of about $5 \times 10^{15}$ to $5 \times 10^{17}$ cm$^{-3}$. A boundary 505 separates the n-doped portion 502a from the p-doped portion 502b of the microring 302.

Vertical polymer poling for RF tuning is achieved by applying a voltage (AC) from source 524 to the second electrode 522, which contacts the P$^{++}$ region 506a and the N$^-$ microring 502, and to the top electrode 314. The vertical RF biasing on the EO polymer may be used for high speed modulation. Lateral carrier injection is achieved by applying a voltage (DC) from source 526 to the two electrodes 520, 522. The lateral carrier injection may be used for wavelength tuning.

In FIG. 5B (carrier injection type Si modulator 550), one-half of the microring 552 is shown. The microring 552 may be formed from p-type or n-type silicon. While a slot microring 502 is shown, like the slot microring 302 in FIG. 3B, a solid microring 402 such as shown in FIG. 4B may also be used. A first metal electrode 520 contacts the N$^{++}$ region 306, while a second metal electrode 522 contacts P$^{++}$ region 506a. Metals usually employed in silicon devices may be employed; examples include aluminum (Al), copper, and tungsten. The metal electrodes 520, 522 may extend through the EO polymer 312 as plugs.

The portion 305" of the Si layer 305 outside of the contact 306 may be N⁻ silicon. The portions 305' of Si layer 305 on either side of the microring 552 and on the outside of the contact 506a may be P⁻ silicon. The silicon (p-type or n-type) used in the microring 552 may be intrinsic Si (i-Si), and has a doping concentration in the range of $1 \times 10^{15}$ to $5 \times 10^{16}$ cm$^{-3}$, and may be lower than the N– and P– doping on either side.

Vertical polymer poling for RF tuning is achieved by applying a voltage (AC) from source 524 to the P$^{++}$ region 506a, which contacts the P$^{++}$ region 506a and the P microring 552, and to the top electrode 314. The vertical RF biasing on the EO polymer may be used for high speed modulation. Lateral carrier injection is achieved by applying a voltage (DC) from source 526 to the two electrodes 520, 522. The lateral carrier injection may be used for wavelength tuning.

In the structures depicted in FIGS. 5A-5B, n-doped regions may be replaced with p-doped regions and vice versa, employing the same dopant concentration ranges as described above.

In both devices shown in FIGS. 5A-5B, the combination of the vertical poling for RF tuning and lateral carrier injection/depletion modulator for wavelength tuning eliminates the need for a thermal heater to reduce power consumption.

The devices 300, 400, 500, and 550 described above are based on crystalline silicon for the microring 302, 402, 502 and waveguide 304, 404, although polycrystalline silicon may be used as well. Amorphous silicon with in-situ doping may also be employed for the polymer cladding optical modulators disclosed herein. Since the amorphous silicon can be grown at a much lower temperature (about 350° C., this can make the process workable at the back-end-of line process, which may allow vertically integrating the CMOS and optical circuits by putting all optical processes at the back-end-of-line. This method makes it possible to vertically integrate the CMOS circuit with photonic circuits by finishing the CMOS circuits first and then adding the photonics at the backend of line. This can reduce the manufacturing cost and simplified the total system design.

The deposition of amorphous silicon (a-Si) may be performed using plasma-enhanced chemical vapor deposition (PECVD), which is a less expensive process than forming crystalline silicon. Such a process would permit integrating optics and electronics on the same chip.

What is claimed is:

1. A polymer-clad optical modulator, including:
   a substrate comprising an insulating material;
   a silicon microring on the substrate;
   a silicon waveguide on the substrate adjacent the silicon microring;
   an electro-optic polymer covering the silicon microring and the silicon waveguide; and
   an electrical contact on top of the electro-optic polymer, wherein a portion of the silicon microring or a portion of an adjacent silicon layer is lightly doped with an n-type dopant.

2. The optical modulator of claim 1, wherein the silicon microring or the adjacent silicon layer is doped to a level of about $5 \times 10^{15}$ to $5 \times 10^{17}$ cm$^{-3}$.

3. The optical modulator of claim 1, wherein the electro-optic polymer comprises a polymer, wherein the refractive index of the polymer changes with the applied electric field.

4. The optical modulator of claim 1, wherein one or both of the silicon microring and silicon waveguide comprise amorphous silicon.

5. The optical modulator of claim 1, wherein the silicon waveguide has a width of about 200 to 400 µm that extends the optical mode in EO polymer.

6. The optical modulator of claim 5, wherein one or both of the microring and the waveguide have a slot configuration.

7. The optical modulator of claim 1, wherein top electrical contact comprises indium tin oxide.

8. An optical modulator with vertical polymer-cladding for RF modulation and depletion type modulation for wavelength tuning including:
   a substrate comprising an insulating material;
   a silicon microring on the substrate;
   a silicon waveguide on the substrate adjacent the silicon microring;
   an electro-optic polymer covering the silicon microring and the silicon waveguide; and
   an electrical contact on top of the electro-optic polymer, wherein an outer portion of the silicon microring is lightly doped with a first conductivity type and an inner portion of the microring is lightly doped with a second, and opposite, conductivity type; and
   wherein a first vertically-disposed electrode contacts a highly doped contact of the first conductivity type outside the silicon microring and a second vertically-disposed electrode contacts a highly doped contact of the second conductivity type inside the microring.

9. The optical modulator of claim 8, wherein the silicon microring is doped to a level of about $5 \times 10^{15}$ to $5 \times 10^{17}$ cm$^{-3}$.

10. An optical modulator with vertical polymer-cladding layer for RF modulation and lateral carrier injection modulation for wavelength tuning, including:
    a substrate comprising an insulating material;
    a silicon microring on the substrate;
    a silicon waveguide on the substrate adjacent the silicon microring;
    an electro-optic polymer covering the silicon microring and the silicon waveguide; and
    an electrical contact on top of the electro-optic polymer, wherein the silicon microring is intrinsic and a portion of an adjacent silicon layer is lightly doped; and
    wherein a first vertically-disposed electrode contacts a highly doped contact of a first conductivity type outside the silicon microring and a second vertically-disposed electrode contacts a highly doped contact of the second conductivity type inside the microring, the silicon microring and the portion of the adjacent silicon layer being of the second conductivity type.

11. The optical modulator of claim 10, wherein the silicon microring is doped to a level of about $5 \times 10^{15}$ to $5 \times 10^{17}$ cm$^{-3}$.

12. A polymer-clad optical modulator, including:
    a substrate comprising an insulating material;
    a silicon microring on the substrate;
    a silicon waveguide on the substrate adjacent the silicon microring;
    an electro-optic polymer covering the silicon microring and the silicon waveguide; and
    an electrical contact on top of the electro-optic polymer, wherein a portion of the silicon microring or a portion of an adjacent silicon layer is lightly doped with a p-type dopant.

13. The optical modulator of claim 12, wherein the silicon microring or the adjacent silicon layer is doped to a level of about $5 \times 10^{15}$ to $5 \times 10^{17}$ cm$^{-3}$.

14. The optical modulator of claim 12, wherein the electro-optic polymer comprises a polymer, wherein the refractive index of the polymer changes with the applied electric field.

15. The optical modulator of claim 12, wherein one or both of the silicon microring and silicon waveguide comprise amorphous silicon.

16. The optical modulator of claim 12, wherein the silicon waveguide has a width of about 200 to 400 μm that extends the optical mode in EO polymer.

17. The optical modulator of claim 16, wherein one or both of the microring and the waveguide have a slot configuration.

18. The optical modulator of claim 12, wherein top electrical contact comprises indium tin oxide.

* * * * *